(12) United States Patent
Roskovensky

(10) Patent No.: US 8,170,282 B1
(45) Date of Patent: May 1, 2012

(54) TECHNIQUE FOR SHIP/WAKE DETECTION

(75) Inventor: John K. Roskovensky, Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 477 days.

(21) Appl. No.: 12/561,282

(22) Filed: Sep. 17, 2009

(51) Int. Cl.
*G06K 9/00* (2006.01)
*G01S 3/80* (2006.01)
(52) U.S. Cl. .......................... 382/103; 382/291; 367/118
(58) Field of Classification Search .................. 382/100, 382/103, 106, 107, 108, 155, 162, 168, 172, 382/173, 181, 194, 199, 221, 232, 254, 274, 382/276, 291, 305, 312; 367/118; 250/336.1; 356/437; 701/16
See application file for complete search history.

(56) References Cited

U.S. PATENT DOCUMENTS

| | | | | |
|---|---|---|---|---|
| 6,064,924 | A * | 5/2000 | Fleischmann | 701/16 |
| 7,480,052 | B1 * | 1/2009 | Roskovensky | 356/437 |
| 7,732,769 | B2 * | 6/2010 | Snider et al. | 250/336.1 |
| 7,940,959 | B2 * | 5/2011 | Rubenstein | 382/103 |
| 7,947,954 | B2 * | 5/2011 | Snider et al. | 250/336.1 |
| 8,094,886 | B1 * | 1/2012 | Roskovensky et al. | 382/103 |
| 8,107,320 | B2 * | 1/2012 | Novick et al. | 367/118 |
| 8,107,677 | B2 * | 1/2012 | Angell et al. | 382/103 |

* cited by examiner

*Primary Examiner* — Seyed Azarian
(74) *Attorney, Agent, or Firm* — Blakely Sokoloff Taylor & Zafman LLP

(57) ABSTRACT

An automated ship detection technique includes accessing data associated with an image of a portion of Earth. The data includes reflectance values. A first portion of pixels within the image are masked with a cloud and land mask based on spectral flatness of the reflectance values associated with the pixels. A given pixel selected from the first portion of pixels is unmasked when a threshold number of localized pixels surrounding the given pixel are not masked by the cloud and land mask. A spatial variability image is generated based on spatial derivatives of the reflectance values of the pixels which remain unmasked by the cloud and land mask. The spatial variability image is thresholded to identify one or more regions within the image as possible ship detection regions.

28 Claims, 7 Drawing Sheets

TECHNIQUE FOR SHIP/WAKE DETECTION

STATEMENT REGARDING FEDERALLY SPONSORED RESEARCH

This invention was developed with Government support under Contract No. DE-AC04-94AL85000 between Sandia Corporation and the U.S. Department of Energy. The U.S. Government has certain rights in this invention.

TECHNICAL FIELD

This disclosure relates generally to ship detection over water.

BACKGROUND INFORMATION

Conventional techniques for daytime detection and identification of ships in open water are human intensive. One such technique simply includes the visual inspection of aerial photographs by a live human being. Since the ships themselves typically appear as small dots in the photographs, the human photograph inspectors often search for telltale signs of a ship, such as their wakes. Not only is this technique labor intensive, but the vastness of the open oceans renders this technique limiting. Only so many square miles of open ocean photographs can be visually inspected by a human being (or even a group of human beings) in a reasonable period of time, before the photographs become stale (i.e., any spotted vessel will have long since departed from the photographed region).

Another conventional technique is the use of radar. However, radar is limited in its range by the curvature of the earth and typically cannot extend much past the horizon. Again, use of radar to detect and identify a ship in open waters still requires active monitoring by a human operator.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

DETAILED DESCRIPTION

Figure 1:
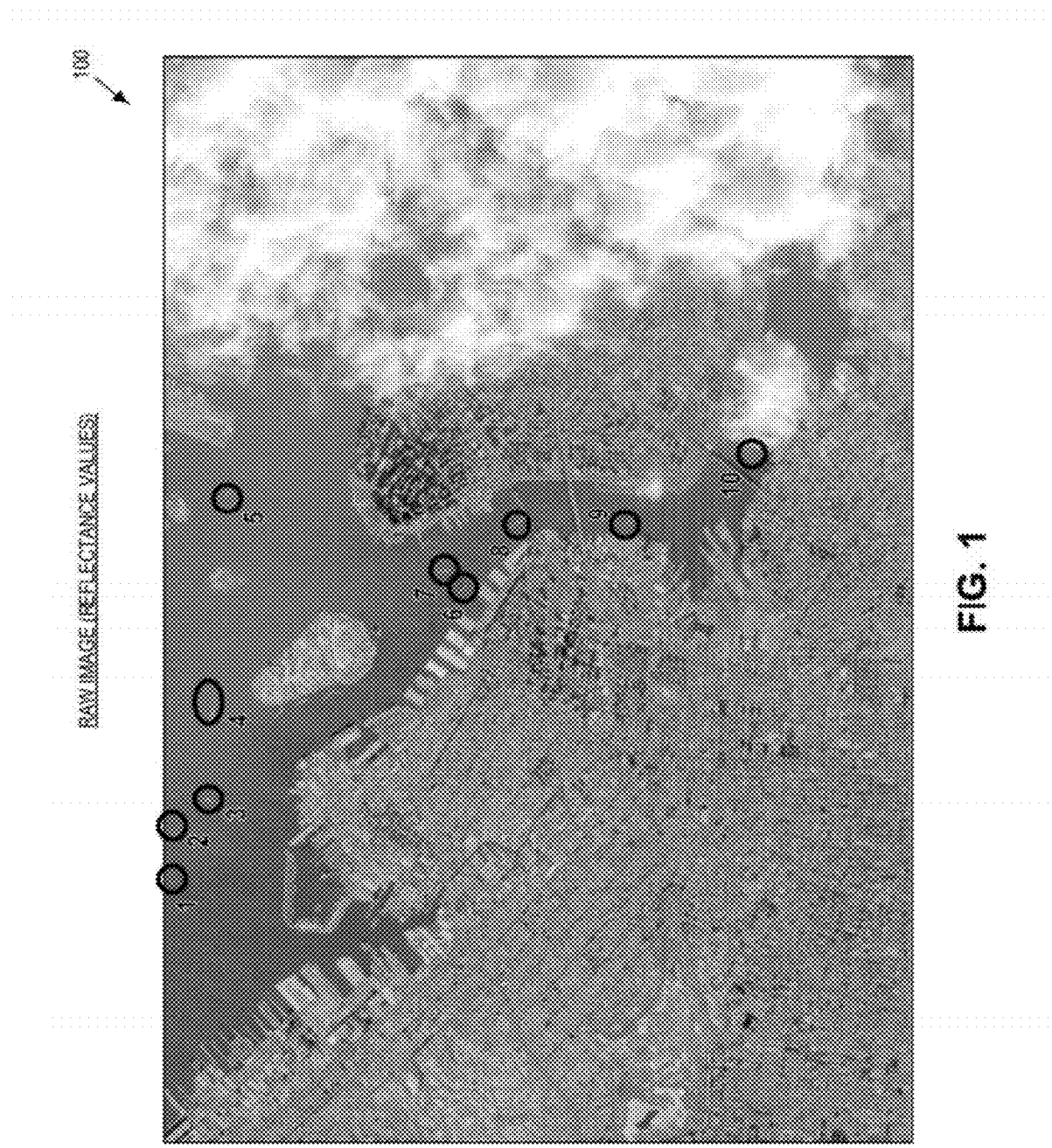
FIG. 1 is a raw image using reflectance values of a portion of the Earth including multiple ships in water, in accordance with an embodiment of the invention.

Embodiments of a system and method for daytime ship/wake detection are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Embodiments of the ship detection technique described herein may be used to detect a vessel, either directly or indirectly via detection of its wake, while operating in water (e.g., open-ocean, lakes, rivers, seas, etc.) during daylight hours. The technique accurately detects ships using aerial perspective images (e.g., satellite imaging, aerial imaging, high altitude land based imaging, etc.) while limiting the number of false positives. Furthermore, the technique is capable of full automation, that is, it does not require live human input to operate. In one embodiment, the ship detection technique is designed to utilize spatial, pixilated data from aerial images in two electromagnetic bands—the visible band ("VIS") and the near-infared ("NIR") band. Collectively, these bands may be referred to as the Visible/Near IR or ("VNIR") bands. Furthermore, the technique operates with passive imaging of the Earth using reflectance or radiance values, as opposed to active radar, which can alert the target vessel of the surveillance.

Since the ocean is fairly dark and homogeneous, outside glint regions, in the VNIR spectral region, ships are generally bright targets that cause a break in an otherwise continuous background. A moving ship will, in addition, generate a whitewater wake which is also bright in the VNIR spectral region. Larger, faster moving vessels generate highly visible whitewater wakes. These wakes last longer and are physically longer when generated in calm waters. The ocean state is directly tied to the strength of the surface wind. Generally, the brightest wakes are found directly behind the ship tracing the ships path. These are produced by the propeller and the bow and are thus named as such. A less bright wake is the Kelvin wake which is commonly aligned in an angle of about 20° from the ships aft path.

Water absorption of electromagnetic radiation increases with wavelength in the VNIR. Therefore, detection of bright objects, which are generally spectrally flat across the VNIR region, can be detected using multi-spectral band techniques. The ship detection technique described herein uses a spatial derivative of a single NIR band reflectance values in multi-dimensions to detect ships. Virtues of this technique include that it is somewhat invariant to viewing geometry and can increase the size of the detection area to that of the actual ship. This is due to a variation in band radiance on both sides of the ship (from low water upwelling radiance to higher ship/wake radiance and the opposite on the other side).

A significant hurdle to any VNIR detection method is that of falsely detecting a non-ship. There are other bright objects in the ocean-atmosphere system that can be falsely detected as a ship. The ocean surface is non-lambertian, which means it does not reflect uniformly in all directions but is a strong specular reflector. Therefore, areas of glint, where the ocean acts similarly to a mirror, are bright. These areas can be predicted based on the solar and viewing geometry and with surface wind information. Unfortunately, due to the large reflected radiance in these regions, accurate detection is difficult to achieve. In addition, waves can produce surfaces the can be angled in the right fashion to produce high reflectance in a particular view in any area. This can produce scattered or random specs of brightness. The number of specs is dependent on the horizontal spatial resolution of the sensor. The higher the resolution, the more of these specs can be expected. Since this is generally a single pixel effect, false positives can be mitigated through the removal of any single detected pixel. Icebergs may also be falsely detected as ships, but their existence equatorward of 60° is limited.

Clouds, of respectable thickness, are also bright in the VNIR region. Their location is difficult to predict. Since clouds occur everywhere on Earth, a cloud mask is devised to screen them out in order to reduce false detection. Since clouds are spectrally flat across the VNIR region and water is not, NIR band/Visible band reflectance ratio is used to detect clouds. This method separates all optically thick clouds from water. It will also detect most land types which is useful so that coast lines and islands are not falsely detected as ships. Unfortunately, ships and part of their wakes are also masked using this procedure as well. However, one significant difference between ships/wakes and clouds/land are their size and shape. Ships/wakes are smaller than most clouds/coastlines and are long and thin. In one embodiment, masked ships and masked wakes are unmasked using a procedure that looks in eight directions for water. Clouds, including cloud edges, generally will see water only in about half of the eight directions whereas ships and their wakes typically see water in about three-quarters of the eight directions.

To further complicate matters, cloud edges are often thin and jagged looking. These may often not be masked or may look like ships. To remove this affect, embodiments of the invention perform a cloud extension procedure to smooth out the cloud edges and to extend the cloud boundaries over possible thin sections.

In order to detect small ships and their wakes with a total length of 20 m, a study showed that a 10 m nadir horizontal pixel resolution was desirable. The pixel resolution study examined three resolutions: 5 m, 10 m, and 20 m. Although 5 m resolution proved better at detecting ship/wakes of 20 m and less, there are a larger number of false alarms also detected. Using 20 m resolution, the false alarm number dropped, but the ability to detect small ship/wakes of 20 m in length was lost.

FIG. 1 is a raw image 100 using reflectance values of a portion of the Earth including multiple ships in water, in accordance with an embodiment of the invention. Raw image 100 is an image of reflectance values in the visual spectrum; however, embodiments of the invention operate using image data in both the NIR spectrum and the visual red ("VISred") spectrum. Raw image 100 is overlaid with visual markers (e.g., numbered circles) of ten possible ship detection regions for illustration purposes, since visual indications or markers of possible ship detection regions is an output of the automated ship detection technique described below. Of course, the specific form of the visual markers may vary and need not be limited to or even include circles, as illustrated in FIG. 1. Other forms of visual markers may be used (e.g., highlights, blinking geometric shapes, colors, etc.). Embodiments of the ship detection technique described herein are capable of detecting possible ship detection regions (e.g., regions 1-10) within raw image 100 and visually marking, or otherwise highlighting, these possible ship detections in an automated manner without human input or intervention. Because the process is automated without human intervention, large swaths of water can be monitored, in real-time using real-time or near real-time imagery.

Figure 2:
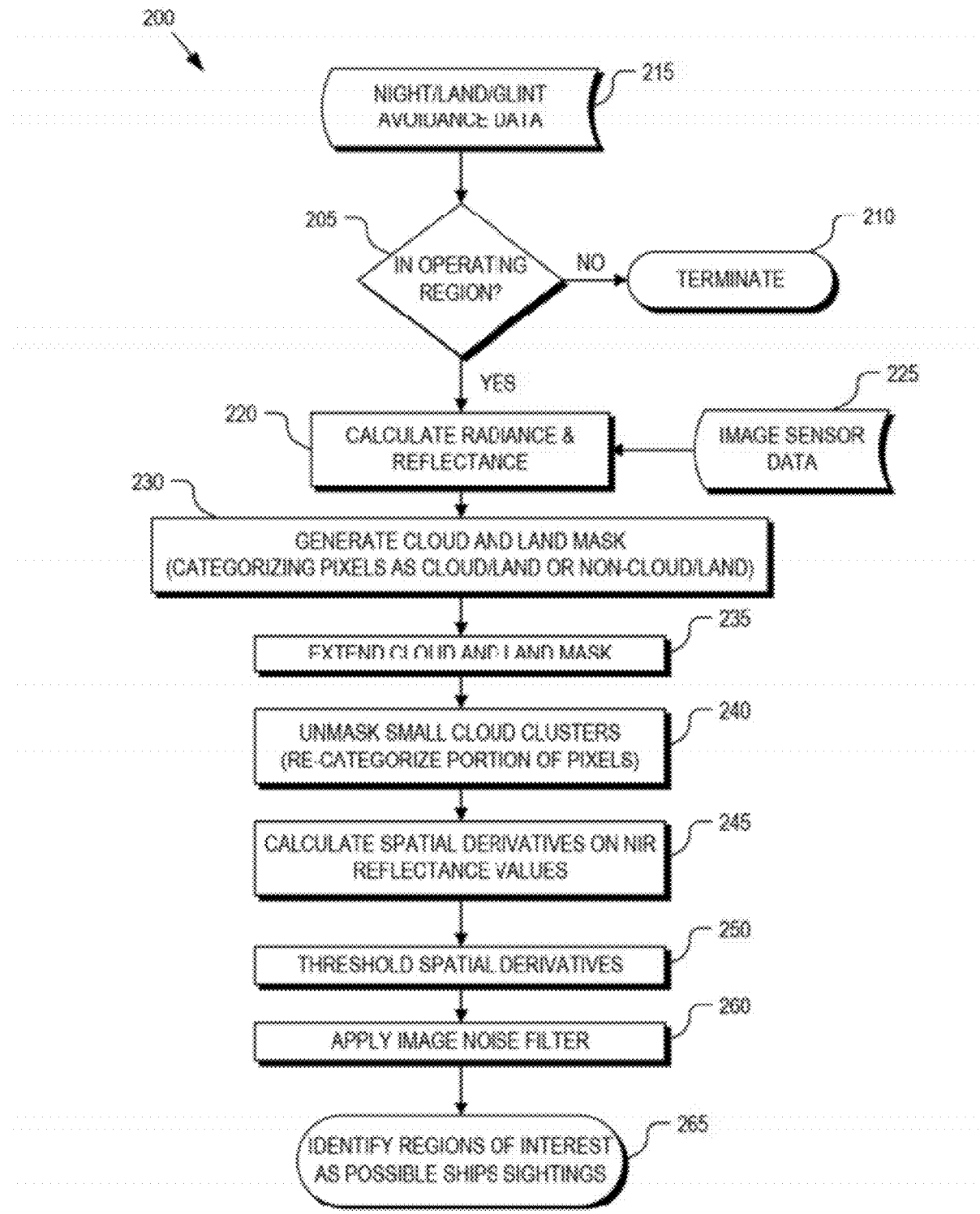
FIG. 2 is a flow chart illustrating a process for automated ship detection, in accordance with an embodiment of the invention.

FIG. 2 is a flow chart illustrating a process 200 for automated ship detection, in accordance with an embodiment of the invention. Process 200 is described with reference to FIGS. 3-6. The order in which some or all of the process blocks appear in process 200 should not be deemed limiting. Rather, one of ordinary skill in the art having the benefit of the present disclosure will understand that some of the process blocks may be executed in a variety of orders not illustrated.

In a decision block 205, process 200 determines whether or not the image data being analyzed falls within an operation region, and by extension, whether or not to employ the ship detection technique by proceeding with process 200. Process 200 determines whether or not to employ based on night/land/glint data 215. The ship detection process will not be employed if either of the following conditions are true: 1) the image (e.g., raw image 100) was taken of a portion of Earth labeled as "nighttime" at the time of image acquisition, 2) the image was taken of a portion of Earth that is labeled as "land," or 3) the image was taken of a portion of Earth that is labeled as a "glint region." The pixel location of each pixel within the image is identified through the position and attitude of the imager (e.g., satellite camera, aerial camera, high altitude land mounted camera) along with the pointing information of the sensor's telescope. If a given pixel or image maps onto a region labeled as "nighttime," "land," or "glint," then the ship detection algorithm is not employed (termination block 210) for that pixel.

In one embodiment, a region is labeled as "nighttime" if it is located at a position with a solar zenith angle greater than 85°, indicating nighttime conditions. Correspondingly, daytime conditions are indicated by a solar zenith angle less than 85°. Of course, the selection of the solar zenith angle may be adjusted smaller or greater, as desired. A region may be labeled as "land" if the region or pixel maps onto land as specified by a reference map, such as geographic information system ("GIS") map. In one embodiment, a multi-pixel (e.g., 10 pixel) buffer is added in all directions around pixels that meet one or more of the avoidance conditions.

If the avoidance conditions are cleared for a given set of pixels, then the ship detection technique may be employed on those pixels. In a process block 220, pixel radiance and reflectance values are calculated and/or accessed from the image data. As previously mentioned, two sets of data may be calculated and accessed—NIR reflectance and VISred reflectance. Process 200 may take image sensor data 225 directly from the sensor and immediately convert it into radiance using established offset and scale factors derived through calibration efforts for the given imaging system. Using the solar and viewing angles pertaining to a specific pixel along with Top-of-Atmosphere ("TOA") solar irradiance, reflectance values may be calculated. The pertinent offsets and scaling factors for calculating reflectance will be device specific for the given imaging equipment.

As previously mentioned, one embodiment of the ship detection technique operates on reflectance values in two bands: NIR and VISred. The NIR band may be centered approximately around 850 nm±100 nm. The VISred band may be centered approximately around 640 nm±60 nm. Other bands may also be used, such as the visual blue ("VISblue") band centered approximately around the 440 nm.

In a process block 230, a cloud and land mask is generated. The cloud and land mask categorizes each pixel into one of two categories: category I (pixel is deemed to be either a cloud or land) and category II (pixel is deemed to be non-cloud and non-land). The pixels categorized into category I are masked by the cloud and land mask. The pixels categorized into category II remain unmasked images of a relatively uniform background of water. In one embodiment, the cloud and land mask may simply flag each pixel categorized into category I with a binary '1', while flagging each pixel categorized into category II with a binary '0.' In this manner, the cloud and land mask may be implemented as a binary matrix of dimensions N by M corresponding to an image of N pixels by M pixels.

In one embodiment, the cloud and land mask (or categorization), is generated on a pixel-by-pixel basis based on a ratio of the NIR:VISred reflectance values for each pixel. A pixel is determined to be an image of a cloud or land if its NIR:VISred ratio is near unity according the Eq. 1:

$$\frac{NIR}{VISred} > T_1. \quad \text{(Eq. 1)}$$

The threshold $T_1$ maybe tunable, but an initial value of 0.7 may be appropriate. This step will label all spectrally flat (most bright objects) as a cloud. Even most land will be masked by this test. This is beneficial in case any of the pixel-mapping is done incorrectly and land strays into the processed image area.

In a process block 235, the boundaries of the cloud and land mask are extended and its edges smoothed. In one embodiment, this is achieved by creating pixel groups throughout the portion of the image being examined. In one embodiment, these pixel groups are 4 pixel×4 pixel groups. If any of the pixels within a single pixel group contains a cloud or land (e.g., any pixel within the group has been flagged with a '1' within the cloud and land mask array), then all pixels are re-categorized and considered to be a cloud or land. This entails extending the cloud and land mask to mask each pixel within the group. For example the cloud and land mask array may be updated to flag each pixel with a '1'. In one embodiment, the pixel grouping is performed in two passes. However, in the second pass, the pixel groupings (e.g., 4 pixel by 4 pixel groups) are offset from the pixel groups of the first pass in the horizontal and/or vertical directions. The first and second passes may be performed on the original cloud and land mask and the re-categorized pixels from the two passes combined into a revised cloud and land mask. Alternatively, the second pass may be performed on the extended cloud and land mask results from the first pass.

Figure 3:
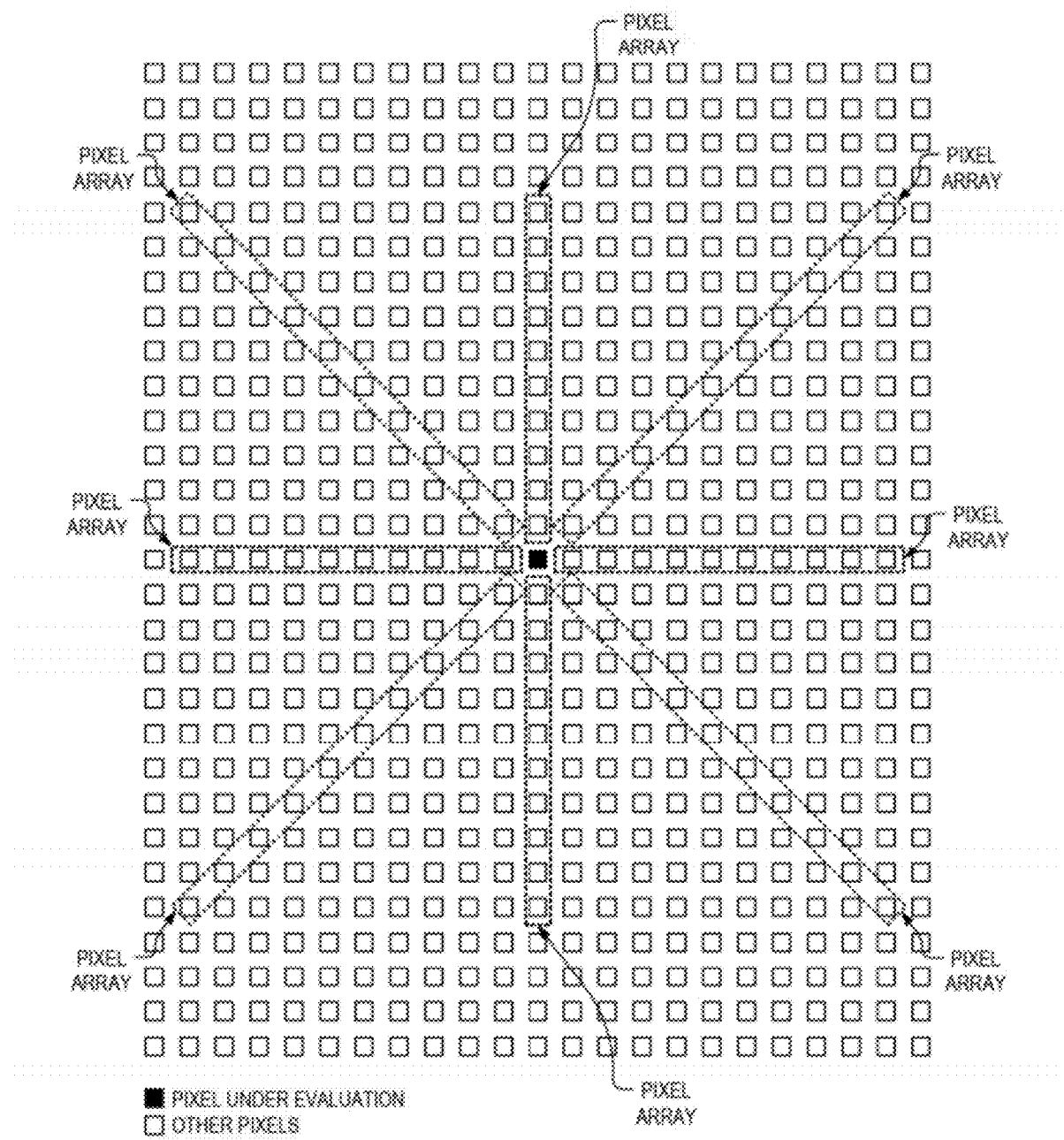
FIG. 3 illustrates a process of unmasking small cloud clusters, in accordance with an embodiment of the invention.

In a process block 240, small cloud clusters are unmasked. As previously mentioned, the cloud and land mask has the side effect of also masking ships and their wakes—in effect categorizing ships and their wakes as "small cloud clusters." To unmask these small cloud clusters, each pixel categorized or labeled as cloud or land by the cloud and land mask (e.g., flagged with a '1') is examined separately. From the single cloud/land pixel, multiple pixel arrays of length N are identified emanating from the single cloud/land pixel. If a threshold number of these pixel arrays includes at least one pixel categorized as a non-cloud and non-land (e.g., flagged with a '0'), then the cloud/land pixel is deemed to be erroneously masked and therefore unmasked and re-categorized as a non-cloud and non-land pixel. In short, process block 240 unmasks small, bright objects, such as ships and wakes that are substantially surrounded by water. FIG. 3 illustrates process block 240, using an example of eight pixel arrays (two horizontal arrays, two vertical arrays, and four diagonal arrays) where each pixel array includes 10 pixels (i.e., N=10). In the illustrated embodiment, if six or more of the eight 10-pixel arrays contain at least one non-cloud and non-land pixel (e.g., pixel flagged with a '0'), then the masked pixel in question is unmasked and re-categorized as a non-cloud and non-land pixel (e.g., relabeled a '0'). It should be appreciated that embodiments of the invention may be implemented with a different number of pixel arrays, having a different emanation orientation, including a different number of N pixels, and a different threshold number of pixel arrays for determining when to re-categorize a given pixel.

Figure 4:
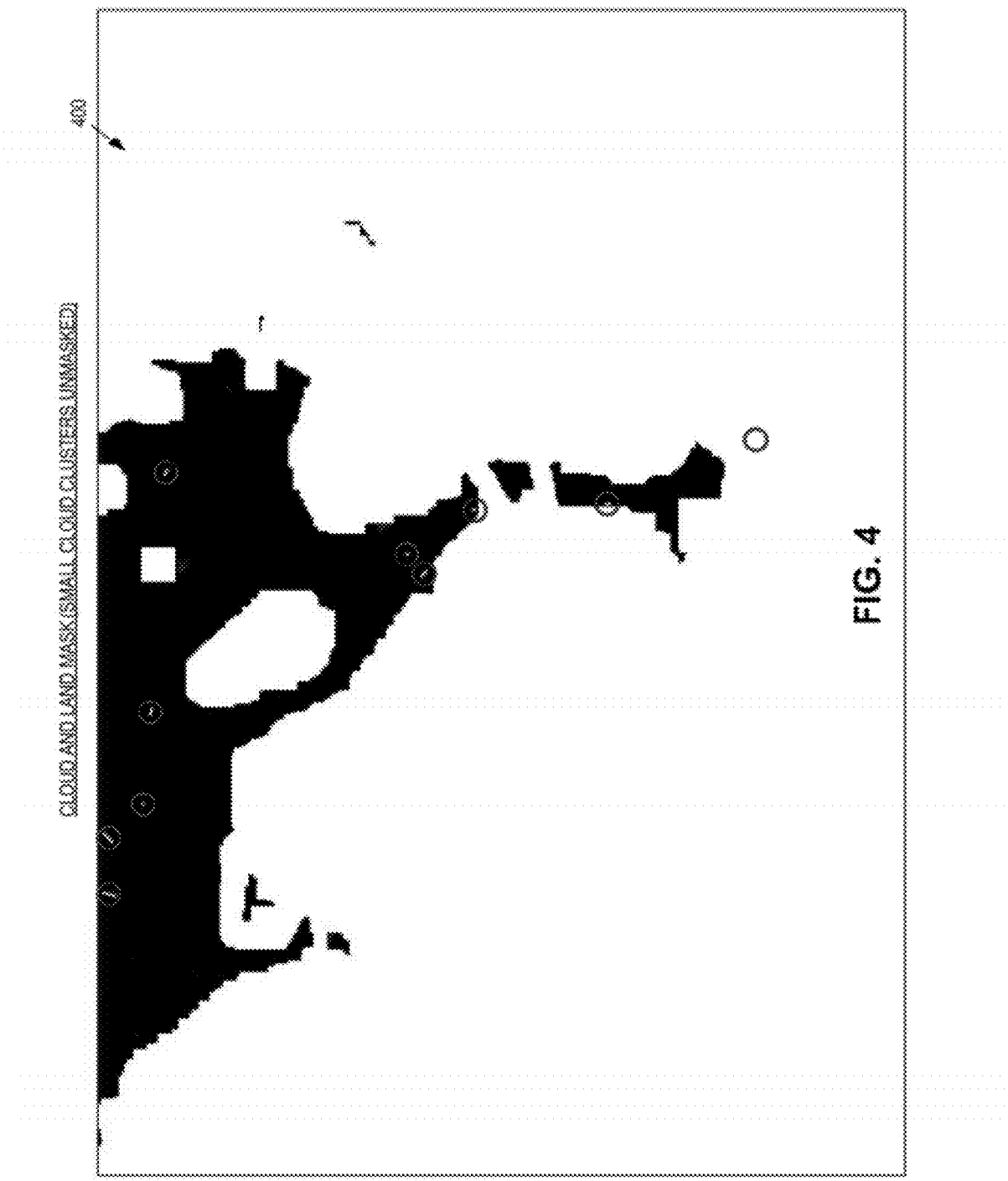
FIG. 4 illustrates a masked version of the raw image after applying a cloud and land mask and unmasking small "cloud clusters," in accordance with an embodiment of the invention.

Once process blocks 230, 235, and 240 have been executed, creation and refinement of the cloud and land mask is complete. FIG. 4 illustrates a masked version of raw image 100 after generating and refining the cloud and land mask according to process blocks 230, 235, and 240.

Figure 5:
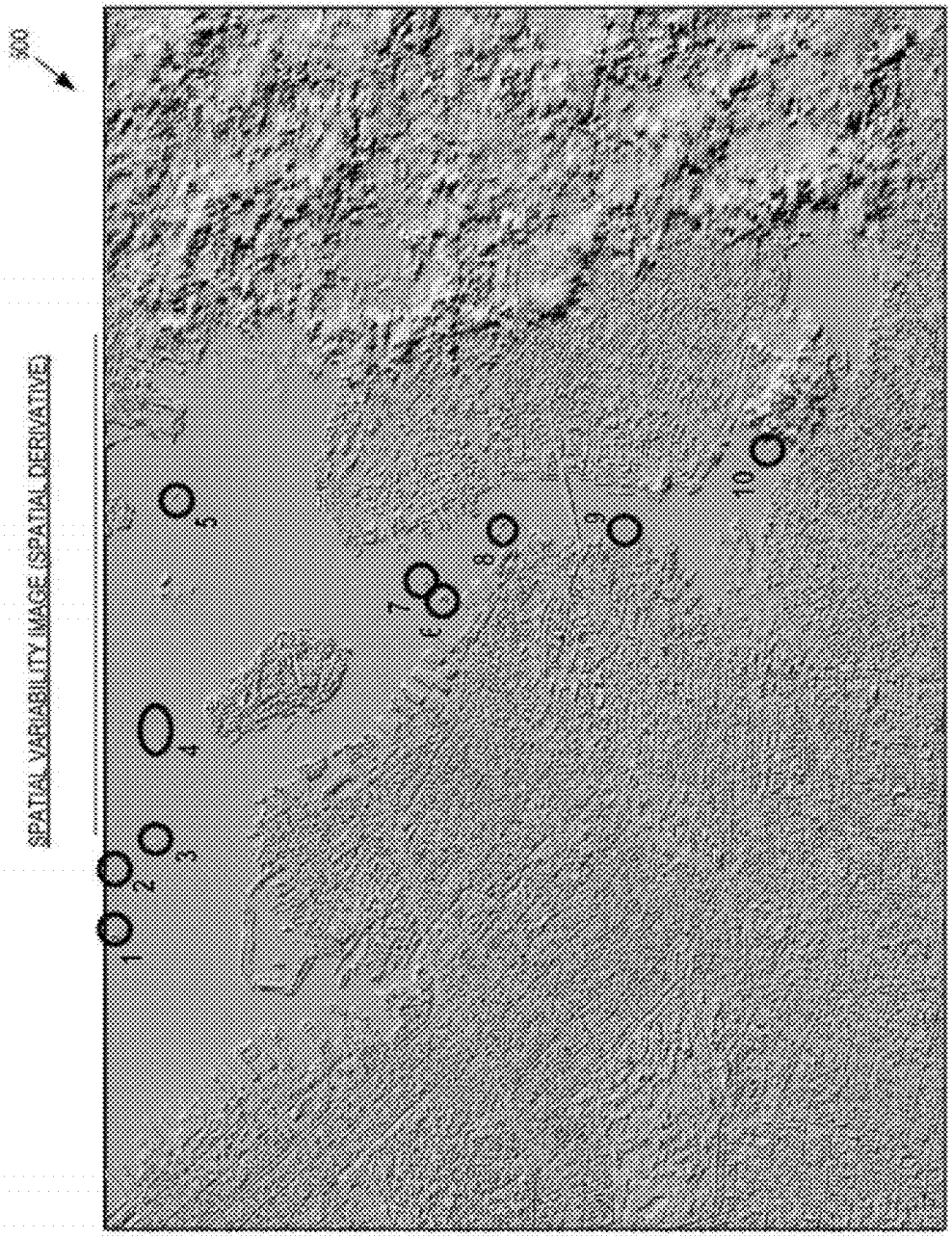
FIG. 5 is a spatial variability image generated by calculating spatial derivatives on the reflectance values of the pixels in the raw image, in accordance with an embodiment of the invention.

In a process block 245, a spatial variability image is generated based on spatial derivatives of the reflectance values of the pixels, which remain unmasked by the cloud and land mask. In one embodiment, spatial derivatives are calculated based upon the NIR band reflectance values for each unmasked pixel. The NIR band is well suited for this because it displays a strong ship/wake signal and, being the longer wavelength, it is nearly completely absorbed by water and is scattered less by atmospheric aerosols than other shorter-wave bands. Initially, a two-dimensional derivative field of the reflectance values is constructed on a pixel-by-pixel basis. The derivative value, $D_{2d}$, for a particular pixel (i, j) may be given by Eq. 2:

$$D_{2d} = \frac{[(R(x_i) - [(R(x)]_{i+1})) + (R(y_j) - R(y_{j+1}))]}{2}, \quad \text{(Eq. 2)}$$

where $R(x_i)$ represents the reflectance value of the $i^{th}$ pixel in row x of the image data and $R(y_j)$ represents the reflectance value of the $j^{th}$ pixel in column y of the image data. FIG. 5 illustrates an example spatial variability image 500 generated based on spatial derivatives of the NIR reflectance values of raw image 100. It should be appreciated that Eq. 2 represents merely one way of calculating a spatial derivative on the reflectance values of image data. One of ordinary skill in the art having the benefit of the instant disclosure will understand that a variety of techniques may be used to obtain spatial derivative data on the NIR reflectance values.

A possible ship detection may be determined by thresholding the spatial derivative values $D_{2d}$ (process block 250). For example, a large positive or negative spatial derivative value according to Eq. 3 is an indicator of a ship and/or its wake.

$$D_{2d} < T_{2a} \text{ or } D_{2d} > T_{2b} \quad \text{(Eq. 3)}$$

Figure 6:
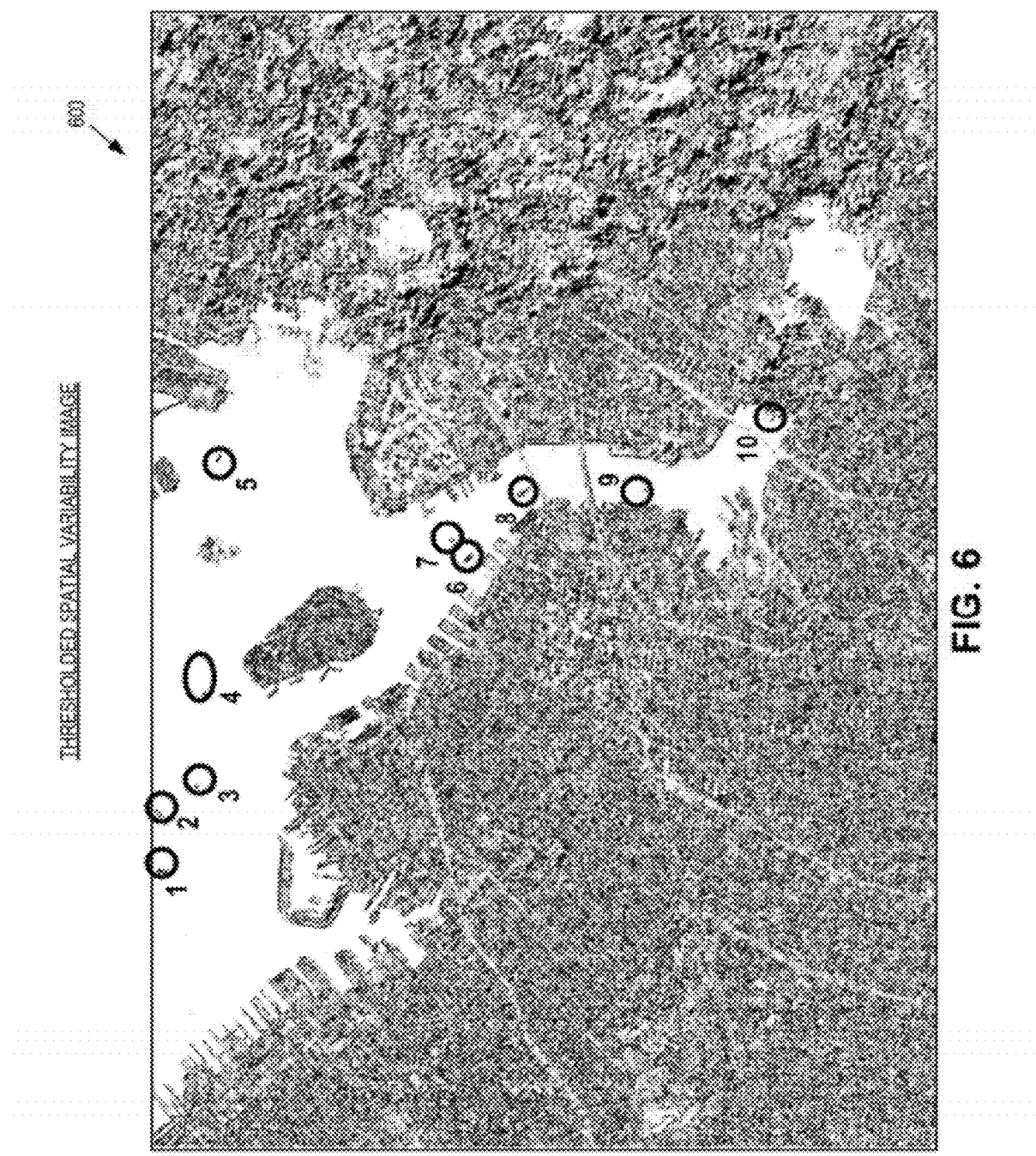
FIG. 6 is a thresholded spatial variability image, in accordance with an embodiment of the invention.

The thresholds $T_{2a}$ and $T_{2b}$ need not be the same. Alternatively, Eq. 3 may be interpreted as the absolute value of $D_{2d}$ must be greater than either $T_{2a}$ or $T_{2b}$. In one embodiment, both thresholds $T_{2a}$ and $T_{2b}$ are centered about a mean scene derivative value, which generally is close to zero. The thresholds $T_{2a}$ and $T_{2b}$ may be tunable, but initial values of $T_{2a}=-0.007$ and $T_{2b}=0.007$ may be acceptable starting points. FIG. 6 illustrates a thresholded spatial variability image 600, in accordance with an embodiment of the invention. When the land and cloud mask 400 is overlaid to block out land and clouds, the possible ship detections 1-10 are accentuated against a white background corresponding to the water.

To reduce false alarms, an image noise filter is further applied (process block 260). Specular reflectance off wave surfaces can produce scattered bright spots that can lead to false alarms at the single pixel scale. To reduce this effect, single and double (two adjacent, isolated pixels) pixel detections are eliminated or suppressed. To implement this, in one embodiment, all adjacent pixels to each detected pixel are checked to determine if the given pixel is a single or double pixel detection. This reduces most the false alarms, but does raise the minimum size of a ship/wake that can be detected.

Finally, in a process block 265, the possible ship detection regions (e.g., circles 1-10) are identified via visual markings on the image data. The visual marking may be rendered on raw image 100, cloud and land mask 400, spatial variability image 500, or thresholded spatial variability image 600.

Embodiments of the above described ship detection technique may be combined with other information, such as ship heading and ship speed to provide a robust surveillance and tracking tool suite. For example, given a cluster of pixels from a single detected ship and its wake, the ship heading can be determined in a couple of ways. A simple best-line fit through the points should be a first good approximation. This leads to two possible headings. The key to determining the correct single heading is by separating the ship and its wake. The ship is usually painted or is slightly darker than its wake. Once ship and wake pixels are identified, a more accurate heading may be calculated by connecting the centroid points of the ship and wake pixels or combining the two best-fit lines determined separately from the ship and wake pixels. If no wake pixels are determined to exist, the assumption is that the ship is not moving and a heading is therefore irrelevant.

The ship speed is somewhat proportional to the length of its wake. It is also dependent on the turbulence created by the ship, which can be associated to its cross-sectional water displacement. This displacement can be correlated to the ships total length. Ship speed can be roughly approximated by employing a simple linear scale between speed and the ratio of the ships wake length to the ships length. The other major factor that has to be considered is the sea state. Wakes tend to last longer in calm conditions. The wake duration decreases as a function of wind speed since it is surface wind speed that primarily determines the sea state in open waters. Therefore, to more accurately determine this parameter, current surface wind speed data should be obtained.

One limitation to detecting ships of a certain size is the image sensors horizontal resolution. Using a 10 m resolution and the fact that single and double detected pixels are removed, a ship/wake must produce enough reflected radiance to "light-up" at least 3 adjacent pixels. This will probably occur if a ship is present in half of the first and last pixel and completely occupies the middle. This means that the minimum detectable ship/wake would theoretically be 20 m long when using a 10 m resolution image sensor.

Figure 7:
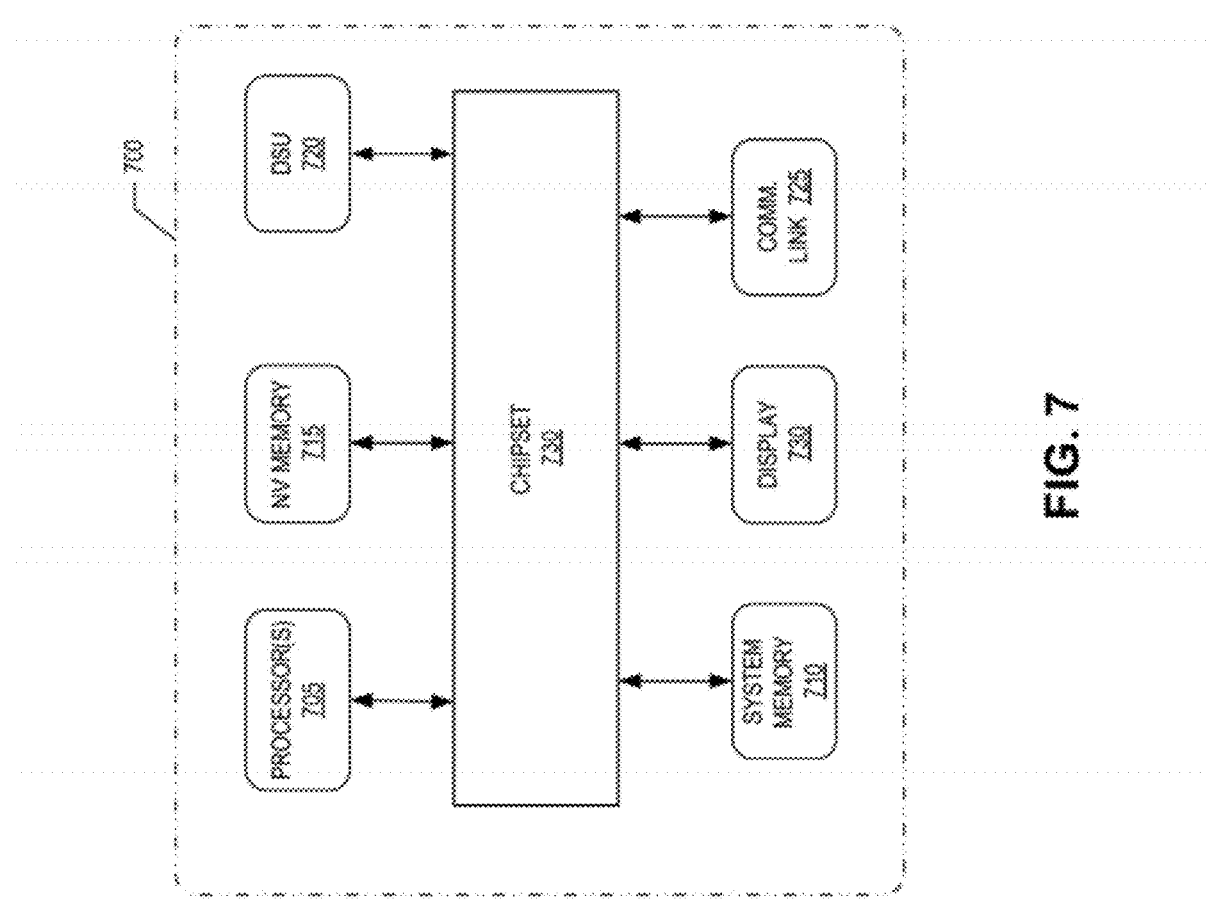
FIG. 7 is a functional block diagram illustrating a processing system for executing embodiments of the ship detection technique disclosed herein.

FIG. 7 is a block diagram illustrating a demonstrative processing system 700 for executing process 200. The illustrated embodiment of processing system 700 includes one or more processors (or central processing units) 705, system memory 710, nonvolatile ("NV") memory 715, a DSU 720, a communication link 725, and a chipset 730. The illustrated processing system 700 may represent any computing system including a desktop computer, a notebook computer, a workstation, a handheld computer, a server, a blade server, or the like.

The elements of processing system 700 are interconnected as follows. Processor(s) 705 is communicatively coupled to system memory 710, NV memory 715, DSU 720, and communication link 725, via chipset 730 to send and to receive instructions or data thereto/therefrom. In one embodiment, NV memory 715 is a flash memory device. In other embodiments, NV memory 715 includes any one of read only memory ("ROM"), programmable ROM, erasable programmable ROM, electrically erasable programmable ROM, or the like. In one embodiment, system memory 710 includes random access memory ("RAM"), such as dynamic RAM ("DRAM"), synchronous DRAM, ("SDRAM"), double data rate SDRAM ("DDR SDRAM") static RAM ("SRAM"), and the like. DSU 720 represents any storage device for software data, applications, and/or operating systems, but will most typically be a nonvolatile storage device. DSU 720 may optionally include one or more of an integrated drive electronic ("IDE") hard disk, an enhanced IDE ("EIDE") hard disk, a redundant array of independent disks ("RAID"), a small computer system interface ("SCSI") hard disk, and the like. Although DSU 720 is illustrated as internal to processing system 700, DSU 720 may be externally coupled to processing system 700. Communication link 725 may couple processing system 700 to a network such that processing system 700 may communicate over the network with one or more other computers. Communication link 725 may include a modem, an Ethernet card, a Gigabit Ethernet card, Universal Serial Bus ("USB") port, a wireless network interface card, a fiber optic interface, or the like.

It should be appreciated that various other elements of processing system 700 have been excluded from FIG. 7 and this discussion for the purposes of clarity. For example, processing system 700 may further include a graphics card for rendering images to a screen (e.g., rendering raw image 100, cloud and land mask 400, spatial variability image 500, or thresholded spatial variability image 600), additional DSUs, other persistent data storage devices (e.g., tape drive), and the like. Chipset 730 may also include a system bus and various other data buses for interconnecting subcomponents, such as a memory controller hub and an input/output ("I/O") controller hub, as well as, include data buses (e.g., peripheral component interconnect bus) for connecting peripheral devices to chipset 730. Correspondingly, processing system 700 may operate without one or more of the elements illustrated. For example, processing system 700 need not include DSU 720.

The processes explained above are described in terms of computer software and hardware. The techniques described may constitute machine-executable instructions embodied within a machine (e.g., computer) readable storage medium, that when executed by a machine will cause the machine to perform the operations described. Additionally, the processes may be embodied within hardware, such as an application specific integrated circuit ("ASIC") or the like.

A computer-readable storage medium includes any mechanism that provides (i.e., stores) information in a form accessible by a machine (e.g., a computer, network device, personal digital assistant, manufacturing tool, any device with a set of one or more processors, etc.). For example, a computer-readable storage medium includes recordable/non-recordable media (e.g., read only memory (ROM), random access memory (RAM), magnetic disk storage media, optical storage media, flash memory devices, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A computer-readable storage medium that provides instructions that, if executed by a machine, will cause the machine to perform operations comprising:
   accessing data associated with an image of a portion of Earth, the data including reflectance values;
   masking a first portion of pixels within the image with a cloud and land mask based on spectral flatness of the reflectance values associated with the pixels, wherein the reflectance values comprise a near infrared (NIR) reflectance value and a visible reflectance value for each of the pixels of the image and wherein the spectral flatness of the reflectance values is determined based on a ratio of the NIR reflectance value to the visible reflectance value for each of the pixels;
   unmasking a given pixel selected from the first portion of pixels when a threshold number of localized pixels surrounding the given pixel are not masked by the cloud and land mask;
   generating a spatial variability image based on spatial derivatives of the reflectance values of the pixels which remain unmasked by the cloud and land mask; and
   thresholding the spatial variability image to identify one or more regions within the image as possible ship detection regions.

2. The computer-readable storage medium of claim 1, further providing instructions that, if executed by the computer, will cause the computer to perform further operations, comprising:
   rendering the image of the portion of Earth to a screen; and
   visually marking the possible ship detection regions on the image.

3. The computer-readable storage medium of claim 1, wherein:
   the NIR reflectance value comprises a first reflectance value of light having a first wavelength between approximately 750 nm and approximately 950 nm, and
   the visible reflectance value comprises a second reflectance value of light having a second wavelength between approximately 580 nm and approximately 700 nm.

4. The computer-readable storage medium of claim 1, wherein the spatial derivative is calculated based on the NIR reflectance values without using the visible reflectance values.

5. The computer-readable storage medium of claim 1, wherein unmasking the given pixel selected from the first portion of pixels when the threshold number of localized pixels surrounding the given pixel are not masked by the cloud and land mask, further comprises:
   analyzing a plurality of linear pixel arrays extending out from the given pixel in different directions on the image to a threshold distance; and
   if a threshold number of the linear pixel arrays include at least one pixel not masked by the cloud and land mask, then unmasking the given pixel.

6. The computer-readable storage medium of claim 5, wherein the plurality of linear pixel arrays extending out from the given pixel in the different directions on the image comprises four pixel arrays extending out vertically or horizontally from the given pixel and four pixels arrays extending out diagonally from the given pixel.

7. The computer-readable storage medium of claim 1, further providing instructions that, if executed by the computer, will cause the computer to perform further operations, comprising:
   extending boundaries associated with the cloud and land mask by:
      grouping the pixels into first pixel groups; and
      masking all pixels within a given first pixel group with the cloud and land mask, if any of the pixels within the given first pixel group were previously masked by the cloud and land mask.

8. The computer-readable storage medium of claim 7, wherein extending the boundaries associated with the cloud and land mask further comprises:
   re-grouping the pixels into second pixel groups offset from the first pixel groups; and
   masking all pixels within a given second pixel group with the cloud and land mask, if any of the pixels within the given second pixel group were previously masked by the cloud and land mask.

9. The computer-readable storage medium of claim 1, further providing instructions that, if executed by the computer, will cause the computer to perform further operations, comprising:
   preventing single or double pixel clusters that otherwise would be deemed to be a possible ship detection from being designated with the possible ship detection.

10. The computer-readable storage medium of claim 1, further providing instructions that, if executed by the computer, will cause the computer to perform further operations, comprising:
    determining whether to execute the instructions associated with the masking, the unmasking, the generating, and the thresholding based upon whether the portion of the Earth is determined to be during night at a time of capturing the image, whether the portion of the Earth is determined to be within a glint region, or whether the portion of the Earth is determined to be land.

11. A computer automated method for detecting ships in water, the method comprising:
    accessing data associated with an image of a portion of Earth, the data including reflectance values, wherein the reflectance values comprise a near infrared (NIR) reflectance value and a visible reflectance value for each of the pixels of the image;
    categorizing pixels within the image into first or second categories based on spectral flatness of the reflectance values associated with the pixels, wherein categorizing the pixels within the image into the first or second categories comprises categorizing each of the pixels based on a ratio of the NIR reflectance value to the visible reflectance value for each of the pixels;
    re-categorizing a given pixel into the second category when a threshold number of localized pixels surrounding the given pixel, which was previously categorized into the first category, are categorized into the second category;
    calculating spatial derivatives on the reflectance values of the pixels categorized into the second category; and
    marking a region of the image as a possible ship detection when the spatial derivatives associated with the pixels in the region have an absolute value greater than a threshold value.

12. The computer automated method of claim 11, wherein marking the region as a possible ship detection comprises:
    rendering the image of the portion of Earth to a screen; and
    visually marking the region on the image.

13. The computer automated method of claim 11,
wherein the NIR reflectance value comprises a first reflectance value of light having a first wavelength between approximately 750 nm and approximately 950 nm, and
wherein the visible reflectance value comprises a second reflectance value of light having a second wavelength between approximately 580 nm and approximately 700 nm.

14. The computer automated method of claim 11, wherein the spatial derivatives are calculated based on the NIR reflectance values without using the visible reflectance values to calculate the spatial derivatives.

15. The computer automated method of claim 11, wherein the first category comprises pixels deemed to be images of clouds or land and the second category comprises pixels deemed to be images of non-clouds and non-land.

16. The computer automated method of claim 11, wherein the threshold value comprises a first threshold value, the method further comprising:
marking a given region as a possible ship detection when the spatial derivatives associated with the pixels in the given region of the image have a value greater than the first threshold value; and
marking the given region as a possible ship detection when the spatial derivatives associated with the pixels in the given region of the image have a value less than a second threshold value.

17. The computer automated method of claim 11 wherein re-categorizing the given pixel into the second category, further comprises:
analyzing a plurality of linear pixel arrays extending out from the given pixel in different directions on the image to a threshold distance; and
if a threshold number of the linear pixel arrays includes at least one pixel categorized into the second category, then re-categorizing the given pixel into the second category.

18. The computer automated method of claim 17, wherein the plurality of linear pixel arrays extending out from the given pixel in the different directions on the image comprises four pixel arrays extending out vertically or horizontally from the given pixel and four pixels arrays extending out diagonally from the given pixel.

19. The computer automated method of claim 11, further comprising extending boundaries associated with the pixels categorized into the first category by:
grouping the pixels into first pixel groups; and
if any of the pixels within a given first pixel group is categorized into the first category, then categorizing all pixels within the given first pixel group into the first category.

20. The computer automated method of claim 19, wherein extending the boundaries associated with the pixels categorized into the first category further comprises:
re-grouping the pixels into second pixel groups offset from the first pixel groups; and
if any of the pixels within a given second pixel group is categorized into the first category, then categorizing all pixels within the given second pixel group into the first category.

21. The computer automated method of claim 11, further comprising:
preventing single or double pixel clusters that otherwise would be deemed to be a possible ship detection from being designated with the possible ship detection.

22. The computer automated method of claim 11, further comprising determining whether to employ the computer automated method for detecting ships based upon whether the portion of the Earth is determined to be during night at a time of capturing the image, whether the portion of the Earth is determined to be within a glint region, or whether the portion of the Earth is determined to be land.

23. A computer-readable storage medium that provides instructions that, if executed by a machine, will cause the machine to perform operations comprising:
accessing data associated with an image of a portion of Earth, the data including reflectance values, wherein the reflectance values comprise a near infrared (NIR) reflectance value and a visible reflectance value for each of the pixels of the image;
categorizing pixels within the image into first or second categories based on spectral flatness of the reflectance values associated with the pixels, wherein categorizing the pixels within the image into the first or second categories comprises categorizing each of the pixels based on a ratio of the NIR reflectance value to the visible reflectance value for each of the pixels;
re-categorizing a given pixel into the second category when a threshold number of localized pixels surrounding the given pixel, which was previously categorized into the first category, are categorized into the second category;
calculating spatial derivatives on the reflectance values of the pixels categorized into the second category; and
marking a region of the image as a possible ship detection when the spatial derivatives associated with the pixels in the region have an absolute value greater than a threshold value.

24. The computer-readable storage medium of claim 23, wherein marking the region as the possible ship detection comprises:
rendering the image of the portion of Earth to a screen; and
visually marking the region on the image.

25. The computer-readable storage medium of claim 23, wherein the threshold value comprises a first threshold value, the computer-readable storage medium further providing instructions that, if executed by the computer, will cause the computer to perform further operations, comprising:
marking a given region of the image as the possible ship detection when the spatial derivatives associated with the pixels in the given region have a value greater than the first threshold value; and
marking the given region of the image as the possible ship detection when the spatial derivatives associated with the pixels in the given region have a value less than a second threshold value.

26. The computer-readable storage medium of claim 23 wherein re-categorizing the given pixel into the second category, comprises:
analyzing a plurality of linear pixel arrays extending out from the given pixel in different directions on the image to a threshold distance; and
if a threshold number of the linear pixel arrays includes at least one pixel categorized into the second category, then re-categorizing the given pixel into the second category.

27. The computer-readable storage medium of claim 23, further providing instructions that, if executed by the computer, will cause the computer to perform further operations, comprising:
extending boundaries associated with the pixels categorized into the first category by:
grouping the pixels into first pixel groups; and if any of the pixels within a given first pixel group is categorized into the first category, then categorizing all pixels within the given first pixel group into the first category.

28. The computer-readable storage medium of claim 23, further providing instructions that, if executed by the computer, will cause the computer to perform further operations, comprising:

preventing single or double pixel clusters that otherwise would be deemed to be a possible ship detection from being designated with the possible ship detection.

* * * * *